United States Patent
Tominaga et al.

(10) Patent No.: US 8,067,869 B2
(45) Date of Patent: Nov. 29, 2011

(54) HOLLOW ACTUATOR

(75) Inventors: Ryuuichirou Tominaga, Kitakyushu (JP); Tomohiro Matsuo, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 120 days.

(21) Appl. No.: 12/686,387

(22) Filed: Jan. 13, 2010

(65) Prior Publication Data

US 2010/0107814 A1     May 6, 2010

Related U.S. Application Data

(63) Continuation of application No. PCT/JP2008/064783, filed on Aug. 20, 2008.

(30) Foreign Application Priority Data

Sep. 11, 2007   (JP) .................................. 2007-235028

(51) Int. Cl.
  *H02K 7/10* (2006.01)
(52) U.S. Cl. .......... 310/77; 74/840; 74/490.07; 310/76; 310/75 R
(58) Field of Classification Search ............... 310/77, 310/76, 75 R; 74/840, 490.07
  See application file for complete search history.

(56) References Cited

U.S. PATENT DOCUMENTS

| | | | |
|---|---|---|---|
| 4,558,611 A * | 12/1985 | Boffelli | 74/826 |
| 4,583,428 A * | 4/1986 | Garnier | 475/346 |
| 4,606,695 A * | 8/1986 | Lenz | 414/735 |
| 5,040,429 A * | 8/1991 | Del Castillo | 74/424 |
| 5,282,719 A * | 2/1994 | McCarty et al. | 416/1 |
| 6,346,784 B1 * | 2/2002 | Lin | 318/9 |
| 6,553,759 B2 * | 4/2003 | Matsufuji | 60/442 |
| 6,569,051 B2 * | 5/2003 | Hirano et al. | 475/208 |
| 7,244,210 B2 * | 7/2007 | Hamai et al. | 475/150 |
| 2003/0209410 A1 * | 11/2003 | Itoh et al. | 198/781.05 |
| 2004/0239196 A1 * | 12/2004 | Miura et al. | 310/77 |
| 2005/0039572 A1 * | 2/2005 | Friedmann | 74/661 |
| 2005/0081660 A1 * | 4/2005 | Migliori | 74/25 |
| 2005/0126843 A1 * | 6/2005 | Irikura | 180/305 |
| 2005/0211490 A1 * | 9/2005 | Shimizu et al. | 180/243 |
| 2006/0213320 A1 * | 9/2006 | Menjak et al. | 74/640 |
| 2006/0219051 A1 * | 10/2006 | Mae et al. | 74/606 R |
| 2006/0266146 A1 * | 11/2006 | Waide | 74/424.92 |
| 2007/0132323 A1 * | 6/2007 | Park | 310/67 R |
| 2007/0290473 A1 * | 12/2007 | Buma | 280/124.106 |
| 2008/0042510 A1 * | 2/2008 | Park | 310/216 |

(Continued)

FOREIGN PATENT DOCUMENTS

CN           101010531           8/2007

(Continued)

OTHER PUBLICATIONS

Chinese Office Action for corresponding CN Application No. 200880102366.2, Jul. 26, 2011.

*Primary Examiner* — Quyen Leung
*Assistant Examiner* — Alex W Mok
(74) *Attorney, Agent, or Firm* — Ditthavong Mori & Steiner, P.C.

(57) ABSTRACT

A hollow actuator includes a motor section, a reduction gear section, a brake section, a rotation position detecting section, and a shaft having a hollow shape and transmitting rotation, wherein the motor section and the brake section are disposed in a same chamber.

7 Claims, 1 Drawing Sheet

U.S. PATENT DOCUMENTS

| | | | |
|---|---|---|---|
| 2008/0054540 A1* | 3/2008 | Buma | 267/195 |
| 2008/0191568 A1* | 8/2008 | Kobayashi et al. | 310/83 |

FOREIGN PATENT DOCUMENTS

| | | |
|---|---|---|
| JP | 02-008536 U | 2/1990 |
| JP | 07-042215 | 2/1995 |
| JP | 08-009589 | 1/1996 |
| JP | 08-011035 U | 3/1996 |
| JP | 2004-328898 | 11/2004 |
| JP | 2006-149139 | 6/2006 |

* cited by examiner

HOLLOW ACTUATOR

CROSS-REFERENCE TO RELATED APPLICATIONS

The present application is a continuation application of PCT/JP2008/064783, filed Aug. 20, 2008, which claims priority to Japanese Patent Application No. 2007-235028, filed Sep. 11, 2007. The contents of these applications are incorporated herein by reference in their entirety.

BACKGROUND OF THE INVENTION

1. Field of the Invention

The present invention relates to a hollow actuator including a hollow portion.

2. Discussion of the Background

Industrial robots have been increasingly used to assemble automobiles on automobile assembly lines and to assemble other components with or without human intervention. In order to realize such a robot, a hollow actuator is used. As described in Japanese Examined Utility Model Registration Application Publication No. 7-42215 and Japanese Unexamined Patent Application Publication No. 2006-149139, a hollow actuator includes a reduction gear mechanism and an AC servo motor having a hollow shaft.

SUMMARY OF THE INVENTION

According to one aspect of the present invention, a hollow actuator includes a motor section, a reduction gear section, a brake section, a rotation position detecting section, and a shaft having a hollow shape and transmitting rotation, wherein the motor section and the brake section are disposed in a same chamber.

According to another aspect of the present invention, a hollow actuator includes a motor section, a reduction gear section, a brake section, a rotation position detecting section, and a shaft having a hollow shape and transmitting rotation, wherein the brake section includes a brake coil disposed on a field core, and an armature disposed so as to face the brake coil, wherein the rotation position detecting section includes a detector disposed on a shield plate disposed on the field core, and a slit substrate and an LED that are disposed so as to face the detector, and wherein the field core of the brake serves as a fixing member of the detector.

According to another aspect of the present invention, a hollow actuator includes a motor section, a reduction gear section, a brake section, a rotation position detecting section, and a shaft having a hollow shape and transmitting rotation, wherein the motor section and the brake section are disposed in a same chamber, and wherein the motor section and the brake section are separated from the reduction gear section and the rotation position detecting section by separation means so that dust from the brake section does not enter the reduction gear section and the rotation position detecting section.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
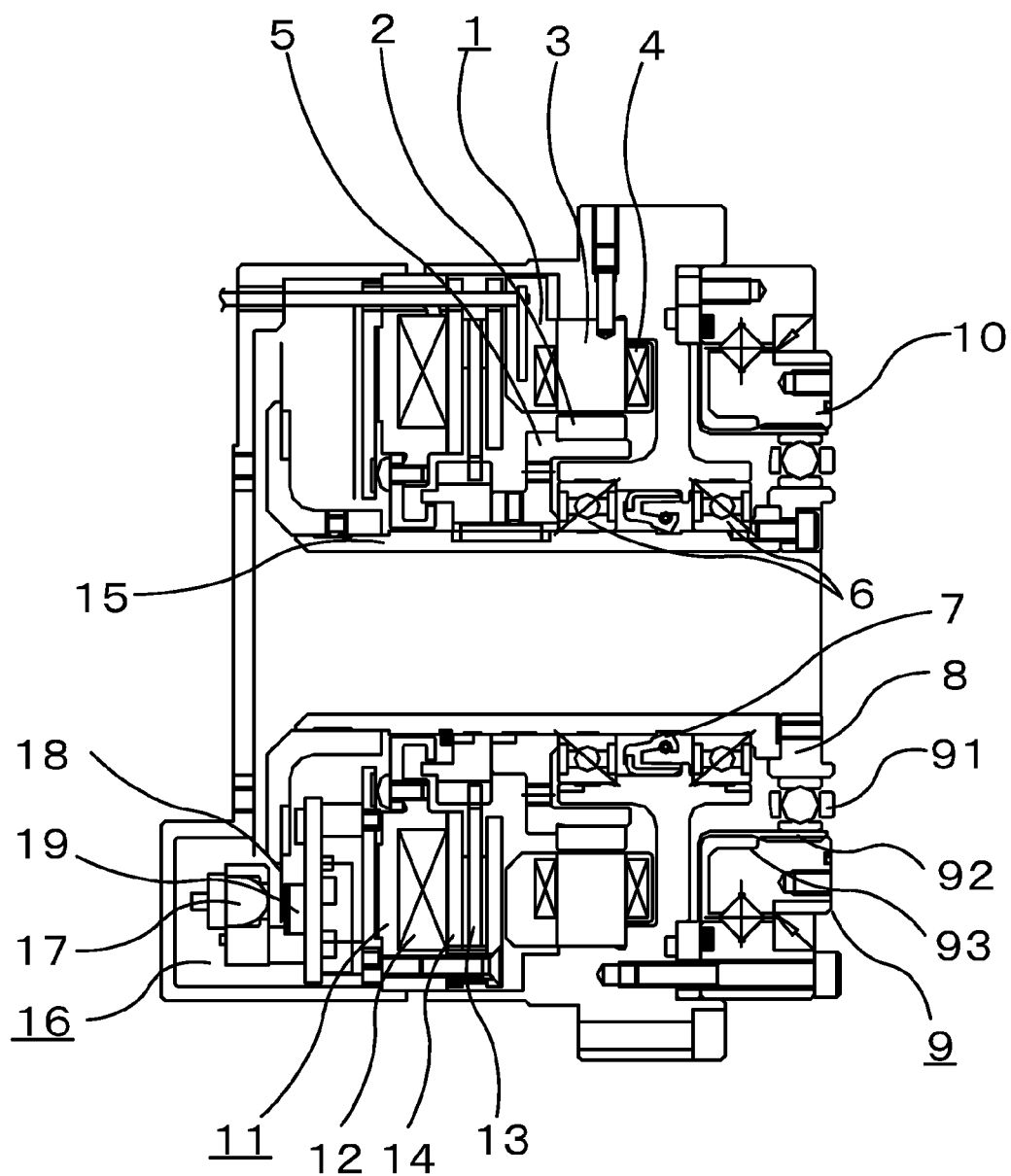
FIG. 1 is a sectional side view of a hollow actuator.

Embodiments will now be described with reference to the accompanying drawings, wherein like reference numerals designate corresponding or identical elements throughout the various drawings.

FIG. 1 is a sectional side view of an embodiment of the present invention. A motor section 1 and a reduction gear section 9 are separated from each other by an oil seal 7. The motor section 1 and an encoder section 16 are separated from each other because the encoder section 16 is attached to a fixing member of a brake coil 12. The motor section 1 and a brake section 11 are disposed in the same chamber.

With this structure, fine dust that is generated in the brake section 11 during braking does not enter the reduction gear section 9 and the encoder section 16. The field core of the brake section 11 also serves as a member for supporting a detector 19 of the encoder section 16 so that commonality of the components is increased. A brake lining 13 is disposed on an end face of the motor section 1. With this structure, the axial length of the hollow actuator can be reduced.

Next, the structure of each section will be described. The motor section 1 includes a stator yoke 3, an armature coil 4 wound around the stator yoke 3, a rotor yoke 5, and a permanent magnet 2 disposed on the rotor yoke 5 so as to face the armature coil 4 with a gap therebetween. The rotor yoke 5 is attached to a hollow shaft 15. The hollow shaft 15 is rotatably supported by a bearing 6, and rotates when the armature coil 4 is energized. The armature coil 4 is terminated and connected to the outside through an opening in the brake section 11.

Next, the reduction gear section will be described. The reduction gear section 9 includes a wave bearing 91, a circular spline 92, and a flexible spline 93. A wave plug 8 is connected to the hollow shaft 15. The wave bearing 91 is joined to the wave plug 8. The flexible spline 93 is fixed to a frame. The circular spline 92 is rotatably supported by the outer periphery of the flexible spline 93. Rotation of the hollow shaft 15 is transmitted to the wave bearing 91 through the wave plug 8 connected to the hollow shaft 15. The rotation is reduced by the gear ratio of the flexible spline 93 relative to the circular spline 92, and output to an output shaft 10.

Next, the brake section will be described. The brake section 11 includes the brake coil 12, an armature 14, the brake lining 13, and a brake spring (not shown). The brake lining 13 is connected to the hollow shaft 15, and rotates together with the hollow shaft 15. When braking, the brake coil 12 is energized, an urging force acts on the brake spring, and the armature 14 and the brake lining 13 contact each other, so that a braking force is generated. With this contact, the actuator can be securely braked.

Next, the encoder section will be described. The encoder section 16 includes an LED 17, a slit substrate 18, and the detector 19. The slit substrate 18 is connected to the hollow shaft 15. Slits that transmit light are formed in the slit substrate 18. The slit substrate 18 is disposed between the LED 17 and the detector 19. The detector 19 receives light emitted from the LED 17 so as to detect a rotation position.

Next, the effect of dust that is generated in the brake section 11 will be described. During braking, friction between the armature 14 and the brake lining 13 generates a braking force. Owing to the friction, abrasive particles with the size of several microns are generated from the components. A friction plate of the brake lining 13 is made of a molded resin, a semi-metallic material, or a sintered alloy. The armature 14 is made of carbon steel. Therefore, the abrasive particles are generated from the friction plate of the brake lining 13, which has a lower hardness. There is a gap having a width in the range of about 0.3 mm to 0.5 mm between the stator yoke 3 and the permanent magnet 2. The gap is sufficiently large compared with the size of the abrasive particles in the dust. Therefore, even if the abrasive particles enter the gap, the effect of the abrasive particles is extremely small. If, for example, the abrasive particles enter the reduction gear section 9, tooth flanks of the circular spline and the flexible spline may be damaged due to the abrasive particles. If the abrasive particles enter the encoder section 16, light emitted from the LED may be reflected diffusely. Therefore, the motor section 1 and the brake section 11 are disposed in the same chamber for the purpose of reducing the axial length of the hollow actuator.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A hollow actuator comprising:
   a motor section;
   a reduction gear section;
   a brake section;
   a rotation position detecting section; and
   a shaft having a hollow shape and transmitting rotation,
   wherein the brake section includes a brake coil disposed on a field core, and an armature disposed so as to face the brake coil,
   wherein the rotation position detecting section includes a detector disposed on the field core, and a slit substrate and an LED that are disposed so as to face the detector, and
   wherein the field core of the brake section serves as a fixing member of the detector.

2. The hollow actuator according to claim 1,
   wherein the armature is disposed in a vicinity of an end of the motor section.

3. The hollow actuator according to claim 1,
   wherein the motor section and the brake section are disposed in a same chamber.

4. The hollow actuator according to claim 1,
   wherein the reduction gear section, the motor section, the brake section, and the rotation position detection section are disposed in this order from a load side.

5. The hollow actuator according to claim 1,
   wherein the field core of the brake section serves as the fixing member of the rotation position detecting section.

6. The hollow actuator according to claim 1, further comprising:
   an oil seal that separates the motor section from the reduction gear section.

7. The hollow actuator according to claim 6,
   wherein the motor section and the brake section are disposed in a same chamber.

* * * * *